May 12, 1925.
W. F. STAGGERS ET AL
1,537,559
DEVICE FOR APPLYING NONSKID CHAINS
Filed Nov. 19, 1923
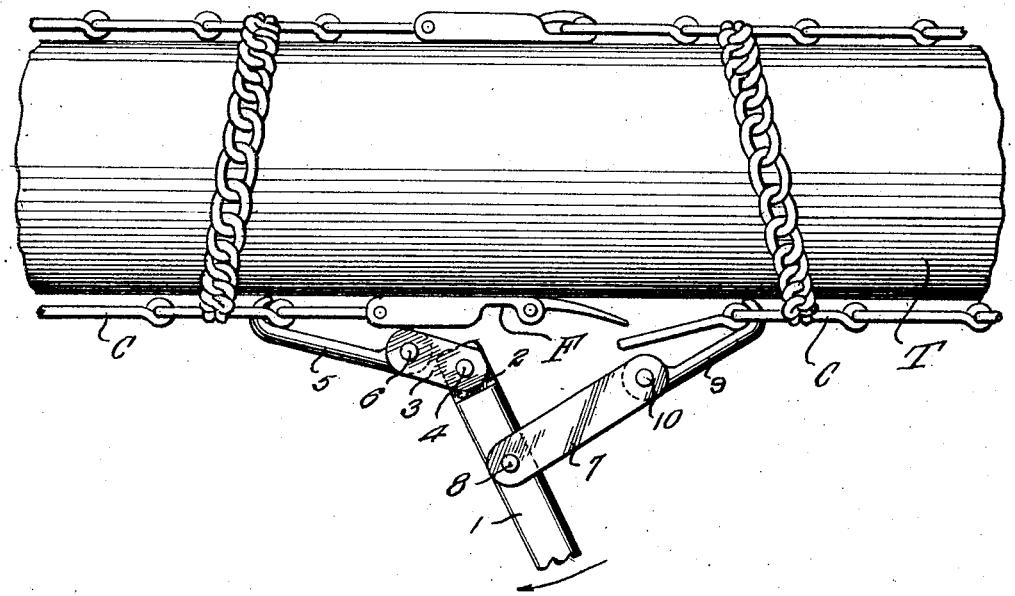
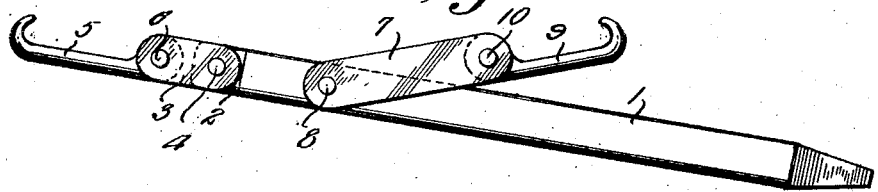
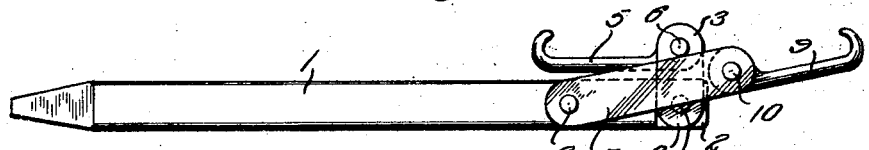
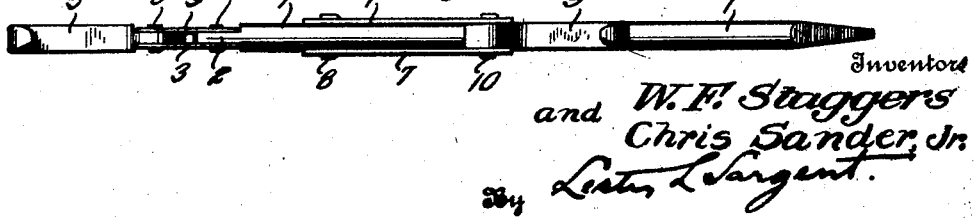
Inventors
W. F. Staggers
and Chris Sander, Jr.
By Lester L. Sargent.
Attorney Patented May 12, 1925.

1,537,559

UNITED STATES PATENT OFFICE.

WILLIAM F. STAGGERS, OF MANNINGTON, AND CHRIS SANDER, JR., OF WHEELING, WEST VIRGINIA; SAID STAGGERS ASSIGNOR TO SAID SANDER, JR.

DEVICE FOR APPLYING NONSKID CHAINS.

Application filed November 19, 1923. Serial No. 675,723.

*To all whom it may concern:*

Be it known that we, WILLIAM F. STAGGERS and CHRIS SANDER, Jr., citizens of the United States, residing at Mannington, in the county of Marion and State of West Virginia, and Wheeling, in the county of Ohio and State of West Virginia, have invented a new and useful Device for Applying Nonskid Chains, of which the following is a specification.

The object of our invention is to provide a simple but effective device for putting non-skid chains on automobile wheels and for stretching any chains or other objects where it may be necessary to pull two ends together for hooking together or for making splices.

We attain this and other objects of our invention by the device illustrated in the accompanying drawings, in which:

Figure 1 is a top plan of an automobile wheel showing our device applied to the nonskid chain.

Fig. 2 is a side elevation of our device with its hook members spread apart to their extreme limit.

Fig. 3 is another view showing the extent of the flexibility of these hooks, and Fig. 4 is an edge view of our device.

Like characters of reference indicate like parts in each of the several views.

Referring to Fig. 1 of the drawings, T indicates an automobile tire; C the side chain members of a non-skid chain; and F a conventional fastener or hook for such a side chain. Our device consists of a suitable handle 1 having an end hook 5 mounted on pivot 6 between links 3 which in turn are mounted by pivot 4 on the reduced end portion 2 of handle 1. We provide a second operating hook member 9 mounted by pivot 10 between links 7, which in turn are swingably secured to the handle 1 by pivot 8 at a point a short distance from the end of the handle to which hook 5 is operatively attached. Links 7 are of sufficient length to permit of swinging the hook 9 around the links 3 in the manner illustrated in Fig. 3 of the drawings, thus permitting of materially shortening the operative length of the device when desired.

The manner of operating the device is illustrated in Fig. 1 of the drawings. The respective hooks are engaged in end links near the free ends of one of the side chains and the handle is manipulated or swung so as to pull the ends of the side chain toward each other to permit of securing the fastener F in closed or fastened position. The device makes it possible to easily apply non-skid chains which under ordinary conditions are applied with great difficulty as it is necessary to pull and tug and work hard to get them on securely.

What we claim is:

1. In a device of the class described, a handle having a reduced end, a pair of links pivotally mounted on said reduced end, a hook pivotally mounted on said links, a second pair of links pivotally mounted on the handle and spaced from the first pair of links, said second pair of links being of sufficient length to extend beyond and swing around the first pair of links, and a hook pivotally mounted on the second pair of links.

2. In a device of the class described, a handle having a reduced end, a pair of links pivotally mounted on said reduced end, a hook pivotally mounted on said links, a second pair of links pivotally mounted on the handle and spaced from the first pair of links, and a hook pivotally mounted on the second pair of links.

3. In a device of the class described, a handle, said handle having a reduced end, a pair of flat links swivelly mounted on said reduced end, a hook swivelly mounted on said links, a second pair of flat links swivelly mounted on the handle at a point spaced from the end thereof, and a hook swivelly mounted on said second pair of links, the second pair of links being of sufficient length to swing around the first pair of links when the latter are in restricted position.

WILLIAM F. STAGGERS.
CHRIS SANDER, JR.